US007535939B2

(12) United States Patent
Kawamoto et al.

(10) Patent No.: US 7,535,939 B2

(45) Date of Patent: May 19, 2009

(54) OPTICAL POWER CONTROL APPARATUS, OPTICAL BEAM SCANNING APPARATUS, IMAGE FORMING APPARATUS, AND OPTICAL POWER CONTROL METHOD

(75) Inventors: Tomohiro Kawamoto, Abiko (JP); Shingo Kitamura, Abiko (JP)

(73) Assignee: Canon Kabushiki Kaisha (JP)

( * ) Notice: Subject to any disclaimer, the term of this patent is extended or adjusted under 35 U.S.C. 154(b) by 30 days.

(21) Appl. No.: 11/757,740

(22) Filed: Jun. 4, 2007

(65) Prior Publication Data

US 2007/0285493 A1 Dec. 13, 2007

(30) Foreign Application Priority Data

Jun. 13, 2006 (JP) ............................ 2006-164068

(51) Int. Cl.
*H01S 3/13* (2006.01)

(52) U.S. Cl. ............................ 372/29.021; 372/29.02; 372/29.015; 372/38.07

(58) Field of Classification Search ............ 372/29.021, 372/29.02, 20.015, 29.014, 38.07, 2.015, 372/38.079

See application file for complete search history.

(56) References Cited

U.S. PATENT DOCUMENTS 5,270,736 A * 12/1993 Inoue et al. ................. 347/246
2003/0231722 A1* 12/2003 Tung .......................... 375/341
2007/0092018 A1* 4/2007 Fonseka et al. ............. 375/265

FOREIGN PATENT DOCUMENTS

JP 6-164070 A 6/1994
JP 8-330661 A 12/1996

* cited by examiner

*Primary Examiner*—Minsun Harvey
*Assistant Examiner*—Kinam Park
(74) *Attorney, Agent, or Firm*—Rossi, Kimms & McDowell, LLP

(57) ABSTRACT

An optical power control apparatus includes a changing unit which changes, a plurality of number of times, the value of a current flowing to an optical beam output apparatus, and an obtaining unit which obtains, in correspondence with each current value, a peripheral optical power representing an optical power at the peripheral part of the spot of the optical beam output from the optical beam output apparatus. The optical power control apparatus also includes a correction unit which corrects the peripheral optical power so that the peripheral optical power and a central optical power representing an optical power at the central part of the spot have an approximately linear relationship in correspondence with each current value. The optical power control apparatus also includes a control unit which controls the optical power of the optical beam output from the optical beam output apparatus in accordance with the corrected peripheral optical power.

18 Claims, 14 Drawing Sheets

OPTICAL POWER CONTROL APPARATUS, OPTICAL BEAM SCANNING APPARATUS, IMAGE FORMING APPARATUS, AND OPTICAL POWER CONTROL METHOD

BACKGROUND OF THE INVENTION

1. Field of the Invention

The present invention relates to a technique of controlling the optical power of an optical beam, more specifically, to a scanning apparatus, image forming apparatus and optical power control method.

2. Description of the Related Art

Generally, it is desired that an optical beam scanning apparatus or image forming apparatus accurately controls the optical power of a laser beam or the like.

An APC (Auto Power Control) circuit described in Japanese Patent Laid-Open No. 8-330661 causes a light-receiving element to monitor a laser beam (front side light) split by a half mirror and controls the optical power based on the result of monitoring. This APC scheme will be called a front side light APC scheme.

In the front side light APC scheme, however, it is necessary to place a half mirror in an optical system to split a beam into transmitted light and reflected light. Hence, the efficiency of optical power use (optical power used for exposure/total optical power) becomes low.

Japanese Patent Laid-Open No. 6-164070 proposes another front side light APC scheme without a half mirror in an optical system. According to this APC scheme, a light-receiving element is arranged to receive a part (leakage light) of the spot of a beam output from a laser. The leakage light is cut off by a beam shaping slit and is not used for exposure. The APC circuit controls the optical power based on the optical power of the leakage light obtained by the light-receiving element. This APC scheme will be called a leakage light APC scheme. The leakage light APC scheme required no half mirror. Hence, the efficiency of optical power use can be improved as compared to the front side light APC scheme using a half mirror.

However, in the conventional leakage light APC scheme, the optical power (exposed optical power) at the central part of the spot and that (leakage optical power) at the peripheral part have a nonlinear relationship. That is, when the exposed optical power is controlled by using the leakage optical power, a control error may occur. The control error is undesirable because it, for example, degrades the quality of a formed image.

SUMMARY OF THE INVENTION

It is a feature of the present invention to reduce a control error that occurs due to the nonlinear relationship between the optical power at the central part and that at the peripheral part in the leakage light APC scheme.

The present invention is appropriately implemented by, for example, an optical power control apparatus for controlling the optical power of an optical beam output from an optical beam output apparatus. The optical power control apparatus includes a changing unit which changes, a plurality of number of times, the value of a current flowing to an optical beam output apparatus, and an obtaining unit which obtains, in correspondence with each current value, a peripheral optical power representing an optical power at the peripheral part of the spot of the optical beam output from the optical beam output apparatus. The optical power control apparatus also includes a correction unit which corrects the peripheral optical power so that the peripheral optical power and a central optical power representing an optical power at the central part of the spot have an almost linear relationship in correspondence with each current value. The optical power control apparatus also includes a control unit which controls the optical power of the optical beam output from the optical beam output apparatus in accordance with the corrected peripheral optical power.

Further features of the present invention will become apparent from the following description of exemplary embodiments (with reference to the attached drawings).

DESCRIPTION OF THE EMBODIMENTS

An embodiment of the present invention will be described below. Individual embodiments to be described below will serve to understand various concepts including the superordinate concept, intermediate concept, and subordinate concept of the present invention. The scope of the invention is determined by the claims which follow the description and is not limited to the individual embodiments to be described below.

Figure 1:
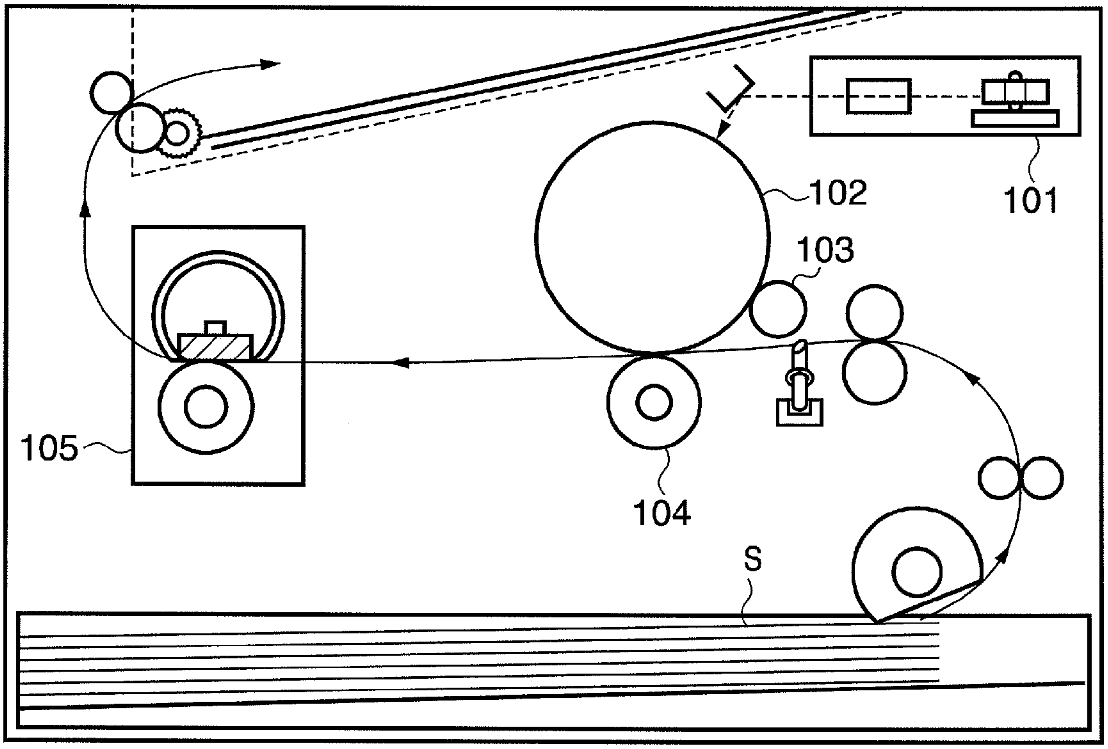
FIG. 1 is a sectional view of an exemplary image forming apparatus according to an embodiment.

FIG. 1 is a sectional view of an exemplary image forming apparatus according to the embodiment. Application examples of an optical power control apparatus according to the present invention are an optical beam scanning apparatus and an image forming apparatus which are merely examples.

An optical beam scanning apparatus 101 is a so-called exposure apparatus. The optical power control apparatus according to the present invention is applied to the optical beam scanning apparatus 101. The optical beam scanning apparatus 101 irradiates the uniformly charged surface of an image carrier (e.g., photosensitive drum) 102 with a beam. An electrostatic latent image corresponding to a print target image is formed on the surface of the image carrier 102. A developing unit (e.g., developing roller) 103 develops the latent image by using a developer. A transfer unit (e.g., transfer roller) 104 transfers the image of the developer from the image carrier 102 to a print medium S. A fixing unit 105 fixes the developer image on the print medium. The image forming apparatus can be commercialized as a copying machine, printer, printing apparatus, facsimile apparatus, or multifunctional peripheral.

Figure 2:
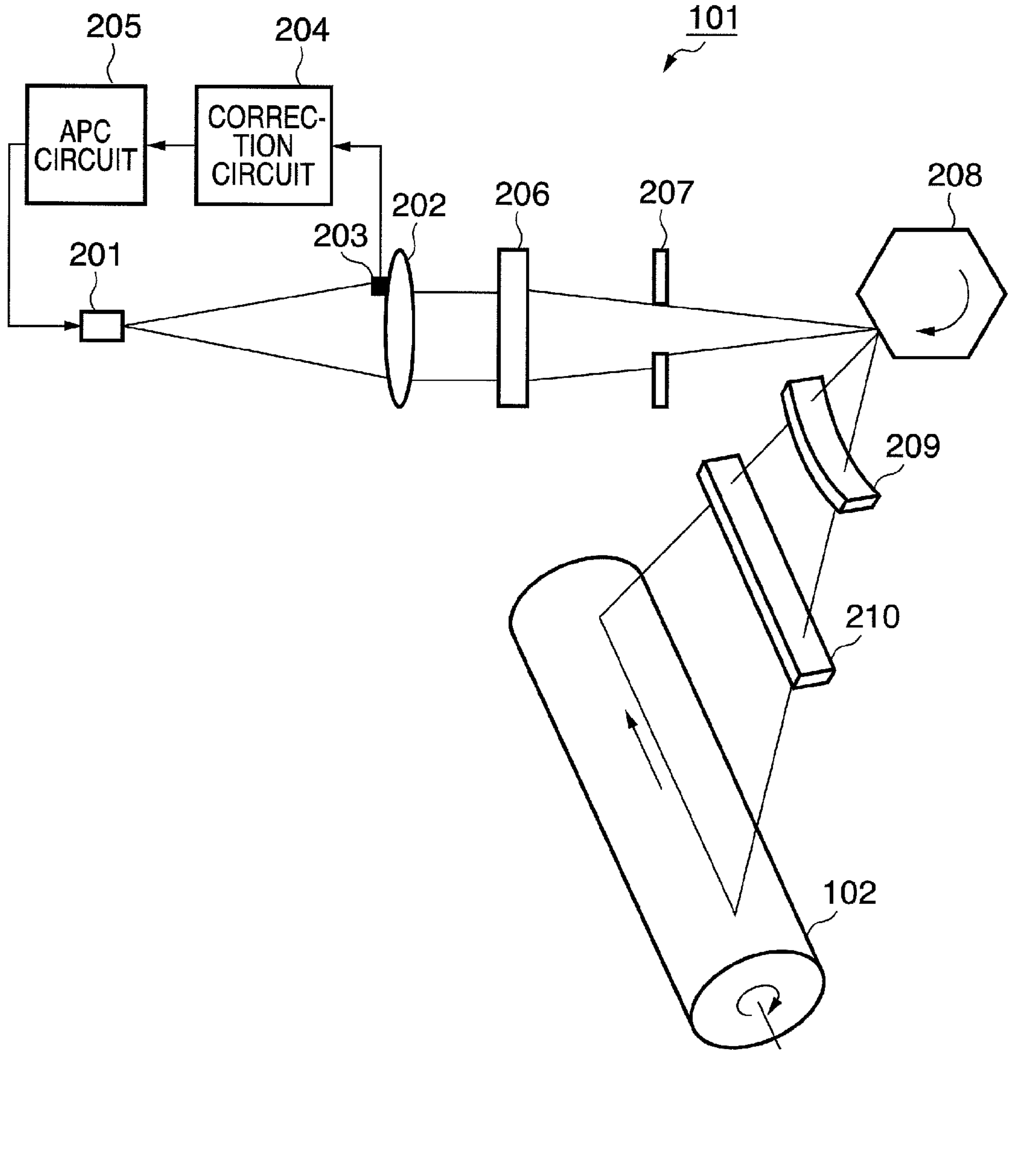
FIG. 2 is a view showing an example of an optical beam scanning apparatus according to the embodiment.

FIG. 2 is a view showing an example of the optical beam scanning apparatus according to the embodiment. A laser 201 such as an edge emitting laser is an example of an optical beam output apparatus. The laser 201 cannot output a beam in both of the front and rear directions, unlike a conventional laser. A conventional laser can employ a back side light APC scheme which uses a beam output in the front direction for exposure and a beam output in the rear direction for optical power control. However, the laser 201 that outputs an optical beam in only one direction due to its structure employs a "leakage light APC scheme" as a kind of front side light APC scheme.

An optical beam output from the laser 201 becomes incident on a collimator lens 202 while spreading to some extent. The optical beam is converted into a parallel beam through the collimator lens 202 and condensed by a condenser lens 206. A beam shaping slit 207 which has a certain width shapes the condensed optical beam. A polygonal mirror 208 as a kind of rotating polyhedron reflects the shaped optical beam. The optical beam reflected by the polygonal mirror 208 passes through an fθ lens 209 and a condenser lens 210 and exposes the surface of the image carrier 102 such as a rotating photosensitive drum.

A light-receiving element 203 detects the optical power (peripheral optical power) of the peripheral part of the beam spot. The peripheral part of the spot is not used for exposure. The peripheral part of the spot corresponds to so-called "leakage light" that is cut off by the beam shaping slit 207. That is, the light-receiving element 203 is arranged at a point to detect the leakage light without influencing the central part of the spot used for exposure.

A correction circuit 204 corrects the peripheral optical power such that the peripheral optical power (leakage optical power) and the central optical power (exposed optical power) representing the optical power at the central part of the spot can have an almost linear relationship. An APC circuit 205 controls the optical power of an optical beam output from the laser 201 in accordance with the corrected peripheral optical power.

Figure 3:
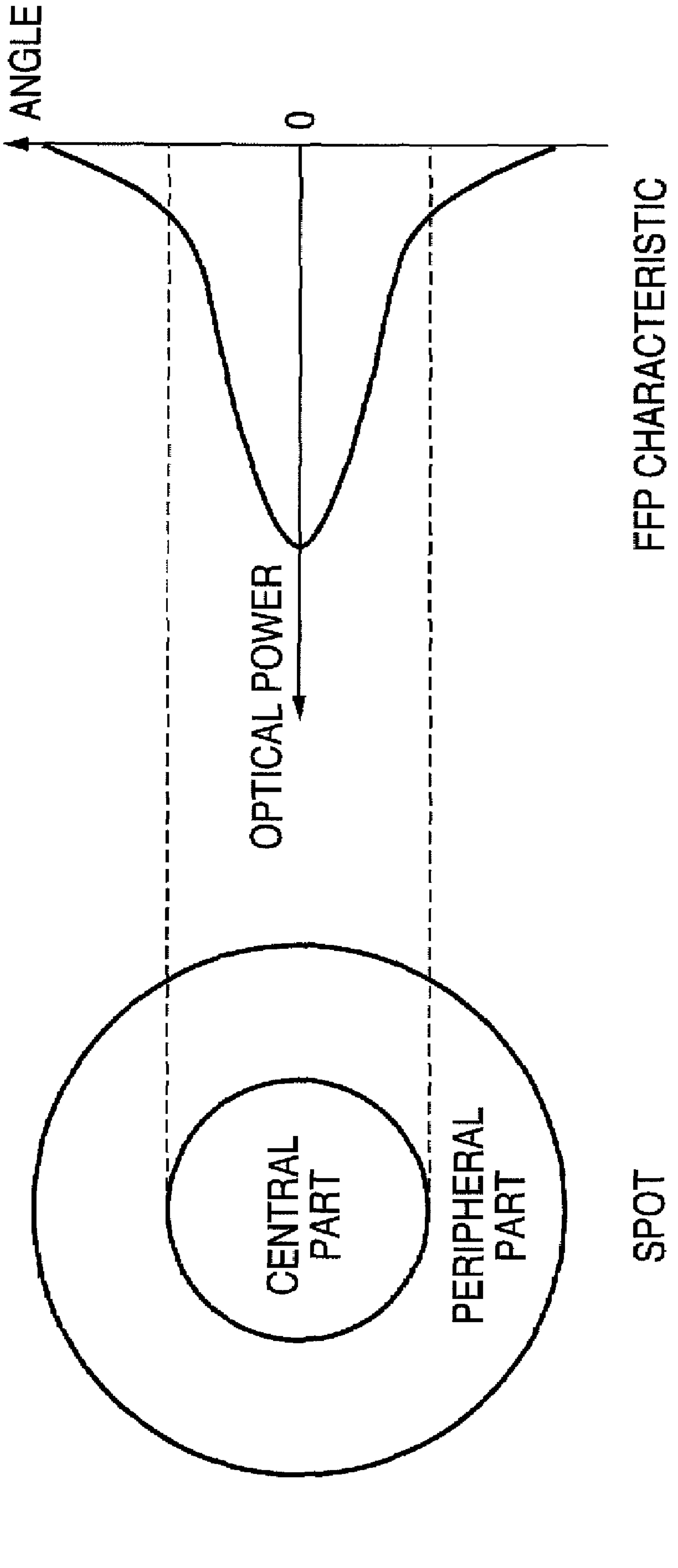
FIG. 3 is a view for explaining the relationship between the spot of an optical beam and optical powers at points in the spot.

FIG. 3 is a view for explaining the relationship between the spot of an optical beam and optical powers at points in the spot. More specifically, the FFP (Far Field Pattern) characteristic of the optical beam is shown on the right side of FIG. 3. The ordinate axis represents angle of exit and the abscissa axis represents optical power. The schematic view of the optical beam is shown on the left side of FIG. 3. The spot is divided into the central part used for exposure and the peripheral part that is not used for exposure because it is shielded by the slit. As described above, the light-receiving element 203 is arranged at the peripheral part.

Figure 4:
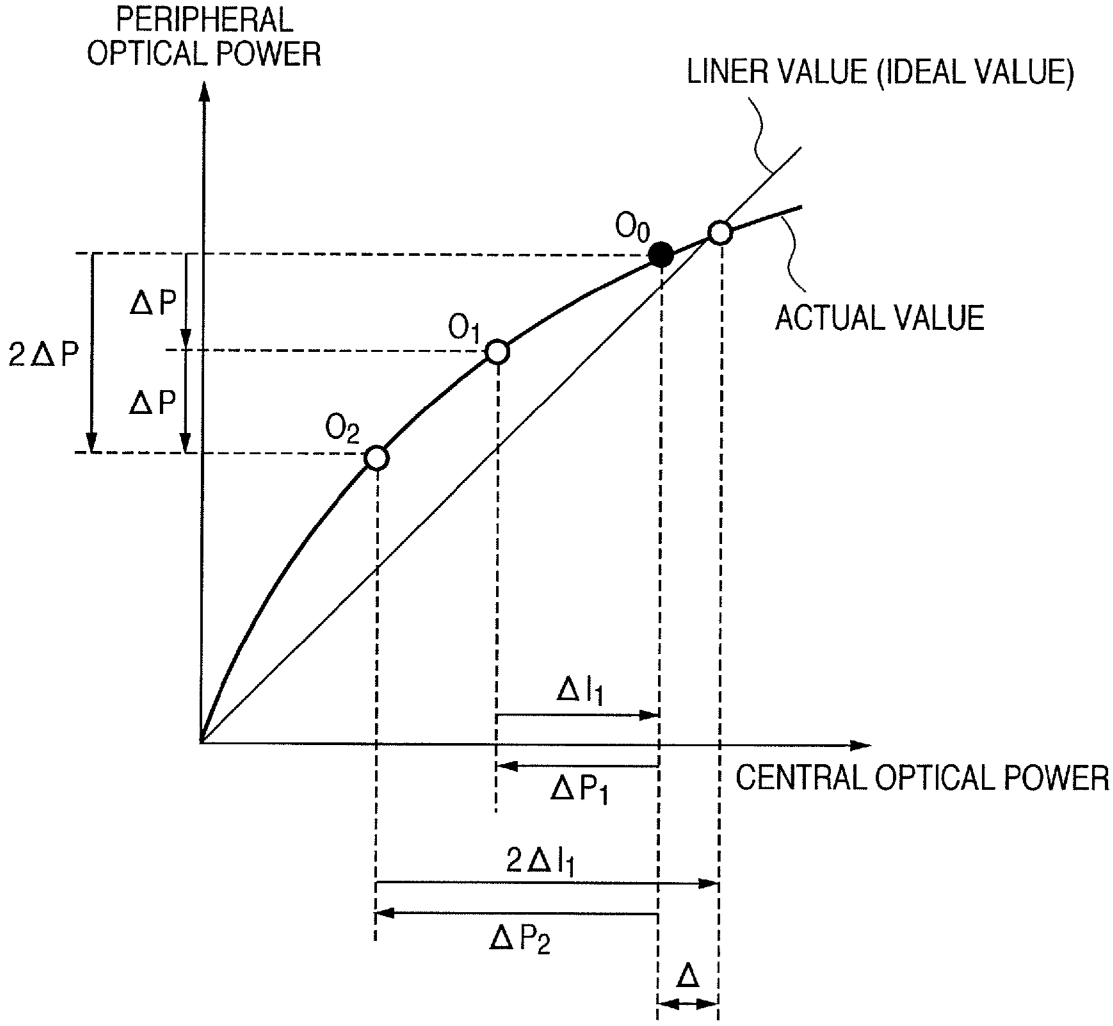
FIG. 4 is a graph showing the relationship between the peripheral optical power and the central optical power obtained as the current flowing to the laser changes.

FIG. 4 is a graph showing the relationship between the peripheral optical power and the central optical power obtained as the current flowing to the laser changes. To control the central optical power used for exposure, the APC circuit 205 preferably measures the central optical power. However, the APC circuit 205 measures the peripheral optical power and controls the optical power due to the above-described reason. As shown in FIG. 4, the relationship between the peripheral optical power and the central optical power is generally not linear.

For example, assume that the peripheral optical power decreases from a reference value $O_0$ to $O_1$ by $\Delta P$. A general APC circuit increases the central optical power by $\Delta P_1$ by increasing the driving current by $\Delta I_1$, thereby correcting the value to the reference value $O_0$. This APC circuit functions on the assumption that the peripheral optical power and the central optical power have a linear relationship, as a matter of course.

Hence, when the peripheral optical power decreases from the reference value $O_0$ by $\Delta P$, the APC circuit can accurately correct the central optical power by increasing the driving current by $\Delta I_1$. However, if the peripheral optical power decreases from the reference value $O_0$ to $O_2$ by $2\Delta P$, this APC circuit cannot sufficiently correct the central optical power.

The actual decrease width of the central optical power is $\Delta P_2$. However, the APC circuit increases the driving current by $2\Delta I_1$ so that the central optical power increases by $2\Delta P_1$. As a result, the central optical power deviates from the target value $O_0$ by $\Delta$ ($\Delta=2\Delta P_1-\Delta P_2$).

In this embodiment, the correction circuit 204 is provided between the light-receiving element 203 and the APC circuit 205. The operation of the correction circuit 204 will be described below in detail.

<Square Correction>

Several methods are available to correct the peripheral optical power so that the peripheral optical power and the central optical power can have an approximately linear relationship. A method (square correction) will be described here, in which a peripheral optical power obtained in the section from the first value to the second value of the current flowing to the laser upon use is normalized and squared.

Figure 5:
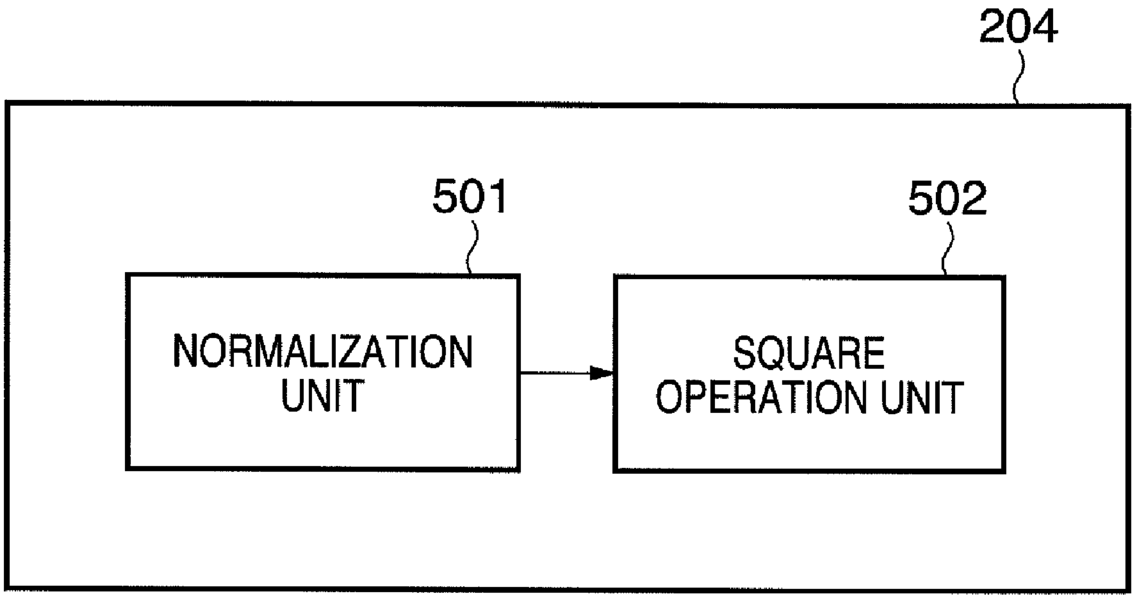
FIG. 5 is a block diagram showing an example of a correction circuit according to the embodiment.

FIG. 5 is a block diagram showing an example of the correction circuit according to the embodiment. A normalization unit 501 is a circuit that normalizes a peripheral optical power obtained in the section from the first value to the second value of the current flowing to the laser upon use. A square operation unit 502 is a circuit that squares the normalized peripheral optical power.

When printing starts, the correction circuit 204 first generates a square correction function $f(\chi)$ ($\chi$ is the peripheral optical power) for square correction. The correction circuit 204 selects an arbitrary section $[I_a, I_b]$ within the range of the operating current of the laser 201. The correction circuit 204 instructs the APC circuit 205 to drive the laser 201 by driving currents $I_a$ and $I_b$ of the two ends of the selected section. In this example, the driving current of the laser 201 changes twice or so. The APC circuit 205 can change the driving current a plurality of number of times more than twice. Next, the correction circuit 204 measures peripheral optical powers $P'_a$ and $P'_b$ corresponding to the current values by using the light-receiving element 203.

Figure 6:
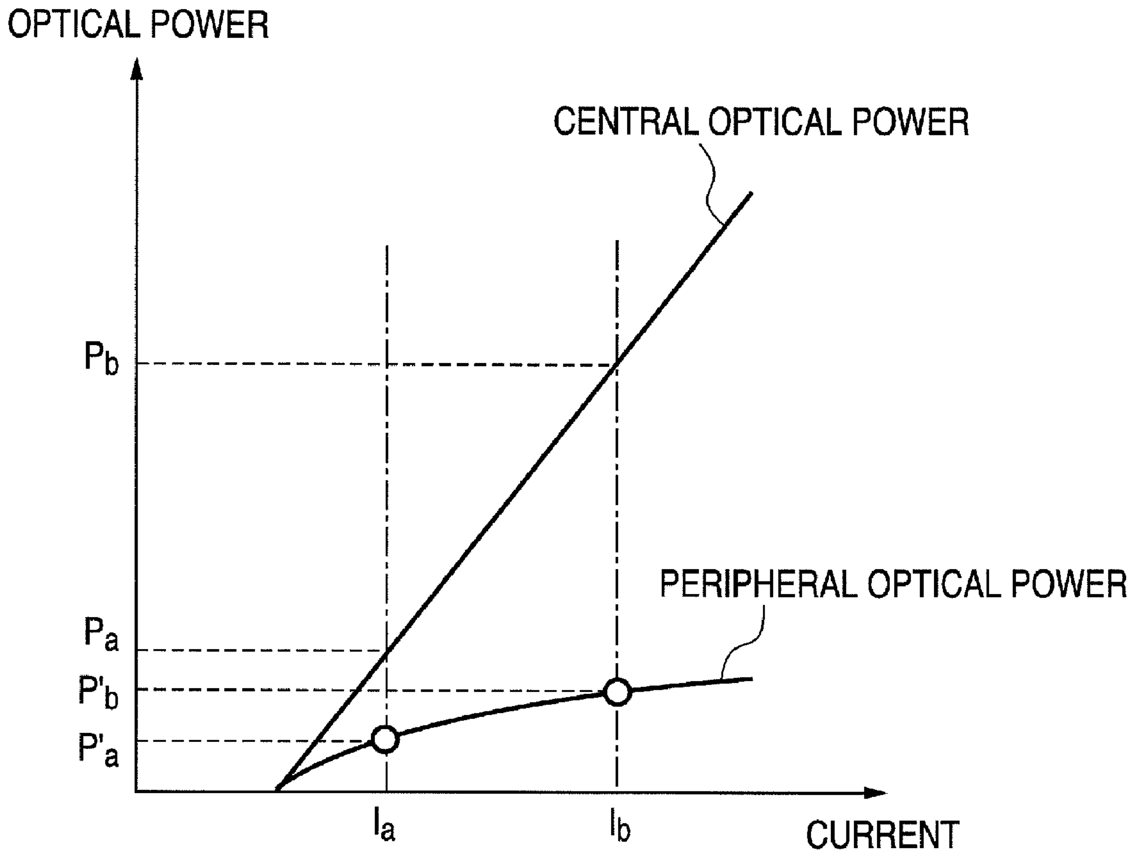
FIG. 6 is a graph showing the relationship between the central optical power and the peripheral optical power corresponding to each current value.

FIG. 6 is a graph showing the relationship between the central optical power and the peripheral optical power corresponding to each current value. Let $P_a$ be the central optical power and $P'_a$ be the peripheral optical power corresponding to the driving current $I_a$. Let $P_b$ be the central optical power and $P'_b$ be the peripheral optical power corresponding to the driving current $I_b$.

The correction circuit 204 generates a normalization function $y(\chi)$ by substituting the peripheral optical powers $P'_a$ and $P'_b$ into $$y(\chi)=\frac{1}{P'b-P'a}(\chi-P'a) \quad (1)$$

Note that the normalization unit 501 may generate the normalization function.

The correction circuit 204 generates the square correction function f(χ) by squaring the normalization function y(χ) Note that the square operation unit 502 may generate the square correction function f(χ).

$$f(\chi)=(y(\chi))^2=\left(\frac{1}{P'b-P'a}(\chi-P'a)\right)^2 \quad (2)$$

Figure 7:
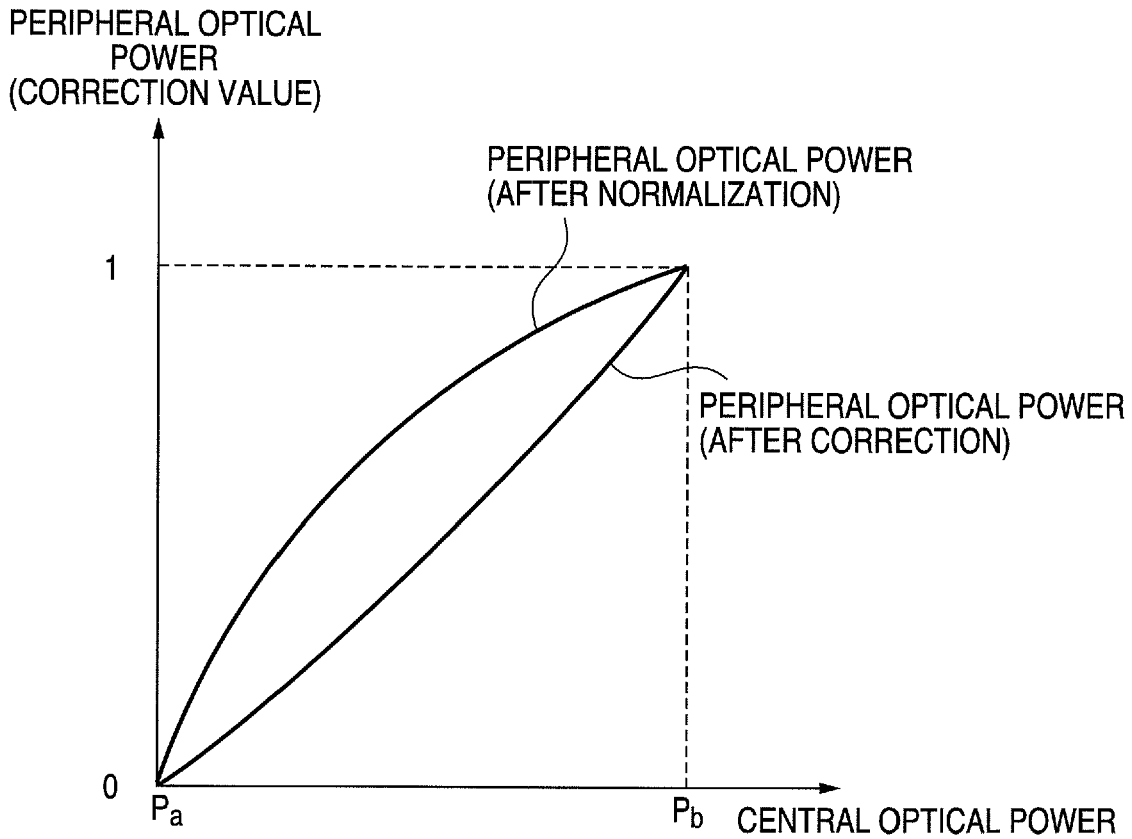
FIG. 7 is a graph for explaining square correction according to the embodiment.

FIG. 7 is a graph for explaining square correction according to the embodiment. The ordinate represents the peripheral optical power, and the abscissa represents the central optical power. When normalization is done, the peripheral optical powers corresponding to the driving currents $I_a$ and $I_b$ roughly match the central optical powers $P_a$ and $P_b$. With the linearization process by square correction, the peripheral optical power and the central optical power have an approximately linear relationship.

Figure 8:
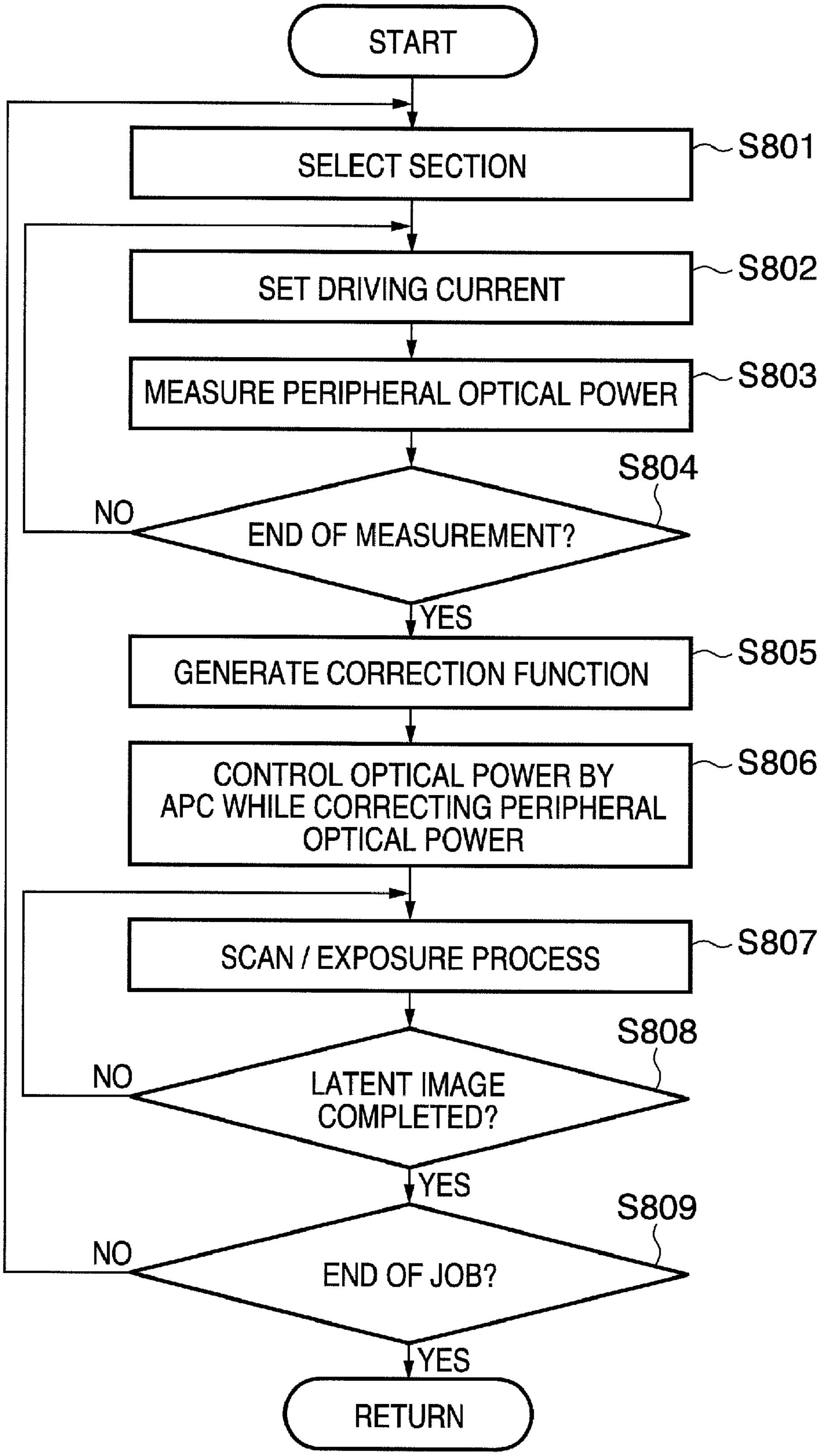
FIG. 8 is a flowchart illustrating an image forming process with optical power control according to the embodiment.

FIG. 8 is a flowchart illustrating an image forming process with optical power control according to the embodiment. Steps S801 to S805 correspond to the above-described correction function generation process.

In step S801, the correction circuit 204 selects the section $[I_a, I_b]$ of the driving current to be used to generate the correction function. This section preferably includes, for example, the minimum current value and maximum current value to be actually used for exposure.

In step S802, the correction circuit 204 sets, in the APC circuit 205, one of the driving currents of the two ends of the selected section and causes the laser 201 to emit light. In step S803, the correction circuit 204 causes the light-receiving element 203 to measure the peripheral optical power.

In step S804, it is determined whether a plurality of number of times of peripheral optical power measurement necessary for generating the correction function is ended. If the measurement is not ended, the process returns to step S802. The correction circuit 204 changes the driving current and executes measurement. If the measurement is ended, the process advances to step S805. The correction circuit 204 generates a square correction function.

When electrostatic latent image formation starts, in step S806 the correction circuit 204 corrects the peripheral optical power χ detected by the light-receiving element 203 in accordance with the correction function f(χ). The APC circuit 205 controls the optical power by APC by using the corrected peripheral optical power.

In step S807, the optical beam scanning apparatus 101 drives the laser 201 in accordance with image data and exposes the image carrier 102. In step S809, the control unit (not shown) of the image forming apparatus determines whether the electrostatic latent image of one page is formed. If image formation is not ended, the process returns to step S807 (or S806 when the APC is required) to continue the exposure process. If image formation is ended, the process advances to step S809. The control unit of the image forming apparatus determines whether to end the job. For example, if the next page remains, the process returns to step S801. If no next page remains, the control unit ends the image formation process.

As described above, according to this embodiment, correction is done to make the nonlinear relationship between the central optical power and the peripheral optical power linear, thereby reducing the control error in the leakage light APC scheme.

In particular, since the central optical power and the peripheral optical power can have an approximately linear relationship by normalizing the peripheral optical power based on the central optical power and squaring the normalized peripheral optical power, the quality of the formed image can be improved.

Square operation is merely an example, and any other operation may be employed. That is, any operation method can be employed if it can correct the peripheral optical power so that it and the central optical power can have an approximately linear relationship.

In the above-described embodiment, the correction function generation process is executed between pages where a sufficient time can be ensured. The process may be done between main scanning cycles.

<Error Correction>

As shown in FIG. 6, the relationship between the driving current and the central optical power is almost linear, whereas the relationship between the driving current and the peripheral optical power is nonlinear. This indicates that when the relationship between the driving current and the peripheral optical power is corrected to a linear relationship, the relationship between the peripheral optical power and the central optical power becomes almost linear.

A method (error correction) will be described, in which the difference (error) between the peripheral optical power and a linear function corresponding to each driving current is obtained in advance, and the peripheral optical power is corrected by using the error.

The correction circuit 204 corrects the peripheral optical power by using a linear function z(χ) and an error function g(χ) representing the difference from the peripheral optical power corresponding to each current value, where χ is the driving current. The linear function z(χ) is an equation defined by a line that connects the first peripheral optical power obtained by flowing a current with the first value to the laser 201 to the second peripheral optical power obtained by flowing a current with the second value.

Figure 9:
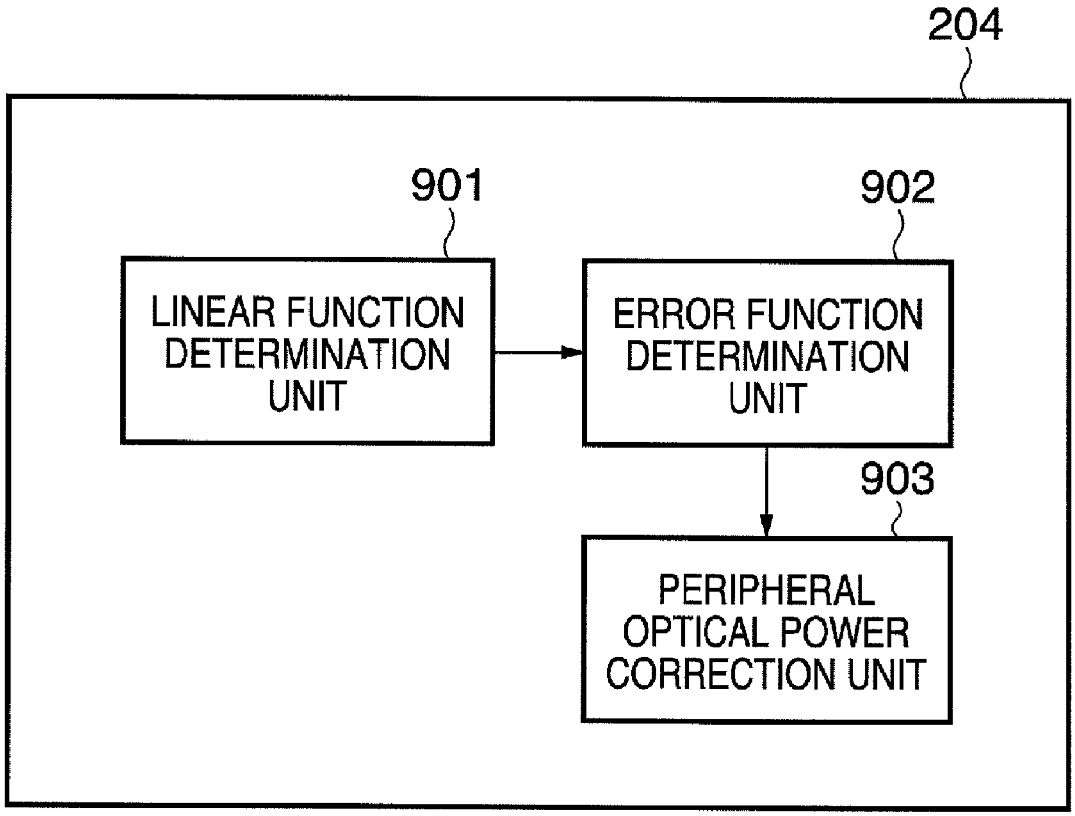
FIG. 9 is a block diagram showing another example of the correction circuit according to the embodiment.

FIG. 9 is a block diagram showing another example of the correction circuit according to the embodiment. A linear function determination unit 901 is a circuit that determines the equation z(χ) of the line that connects the first peripheral optical power obtained by flowing the current with the first value to the laser 201 to the second peripheral optical power obtained by flowing the current with the second value. An error function determination unit 902 is a circuit that determines the error function g(χ) representing the difference between the peripheral optical power and the linear function z(χ)corresponding to each value of the current flowing to the laser 201 upon use. A peripheral optical power correction unit 903 is a circuit that corrects the peripheral optical power by using the determined error function g(χ).

Figure 10:
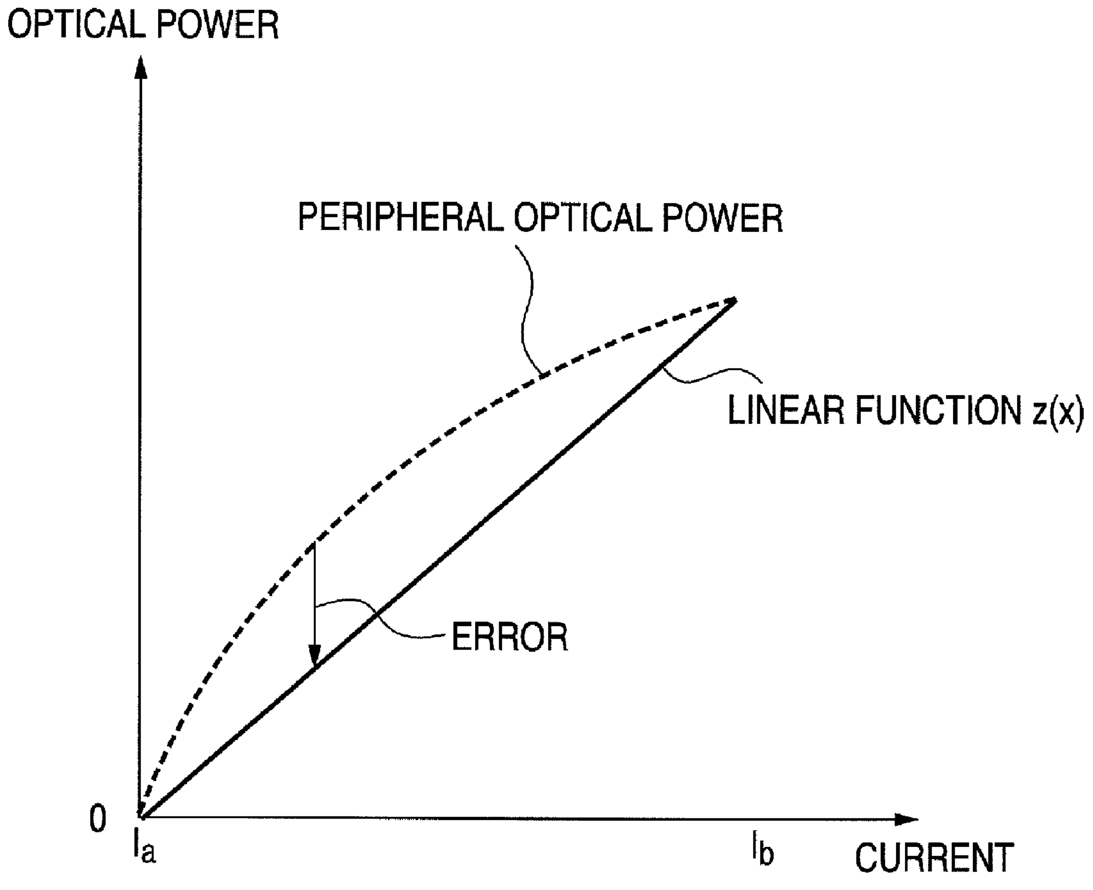
FIG. 10 is a graph showing the relationship between the driving current and the peripheral optical power.

FIG. 10 is a graph showing the relationship between the driving current and the peripheral optical power. The peripheral optical power obtained as the driving current χ changes is nonlinear, as indicated by the broken line. Consider the linear function z(χ) as the equation of the line that connects the peripheral optical powers corresponding to the driving currents $I_a$ and $I_b$. The linear function z(χ) corresponds to the central optical power.

Figure 11:
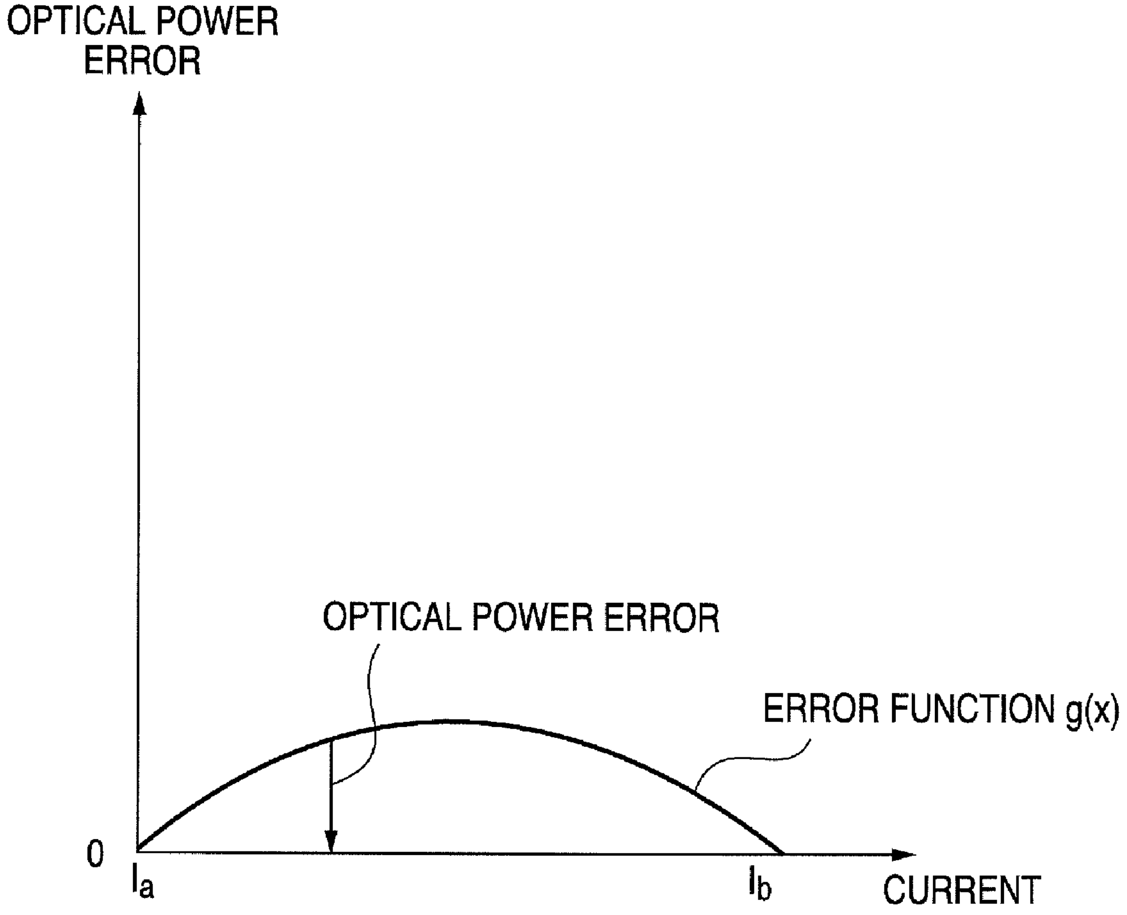
FIG. 11 is a graph showing an example of an error function g(x) according to the embodiment.

FIG. 11 is a graph showing an example of the error function g(x) according to the embodiment. The error function g(χ) is expressed as the difference between the linear function z(χ) and the actual peripheral optical power obtained as the driving current changes from $I_a$ to $I_b$.

Figure 12:
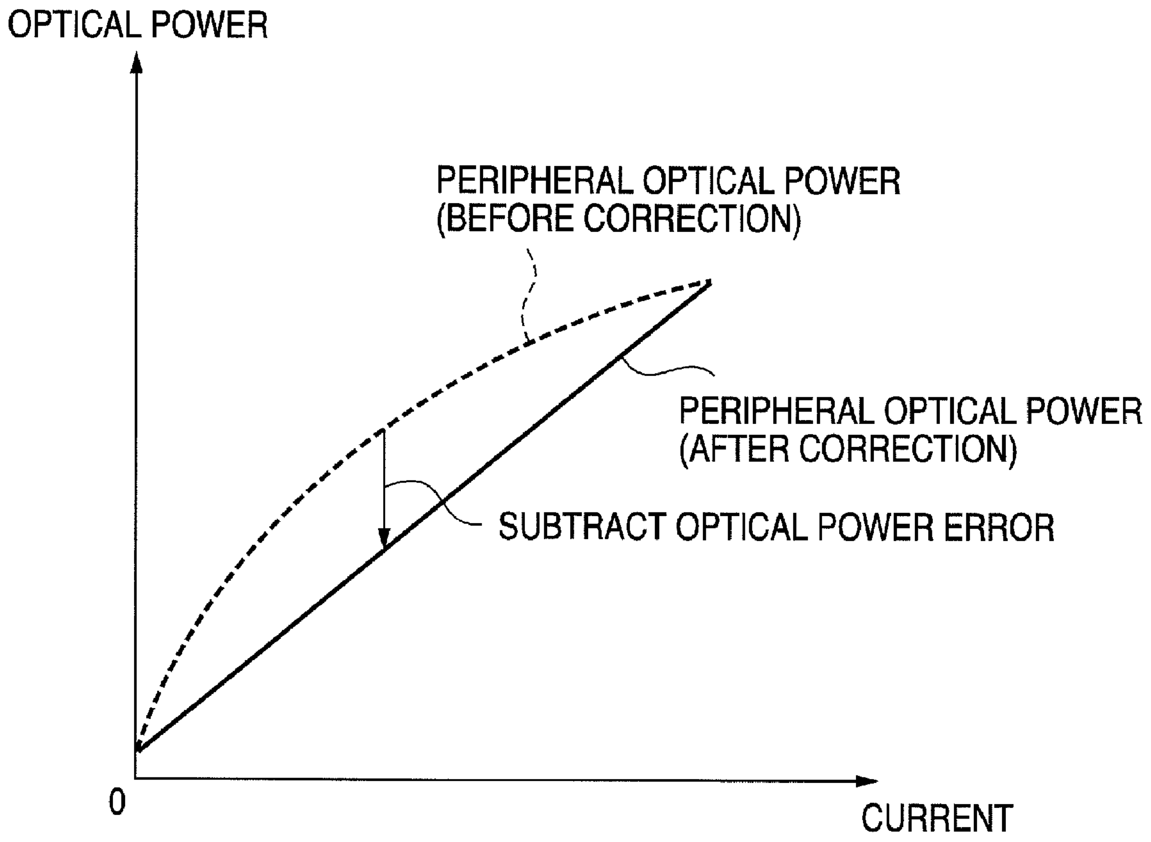
FIG. 12 is a graph for explaining a correction process according to the embodiment.

FIG. 12 is a graph for explaining a correction process according to the embodiment. In APC optical power control, the correction circuit 204 determines the corrected peripheral optical power by subtracting the error function g(χ) from the value of the peripheral optical power obtained by the light-receiving element 203.

Figure 13:
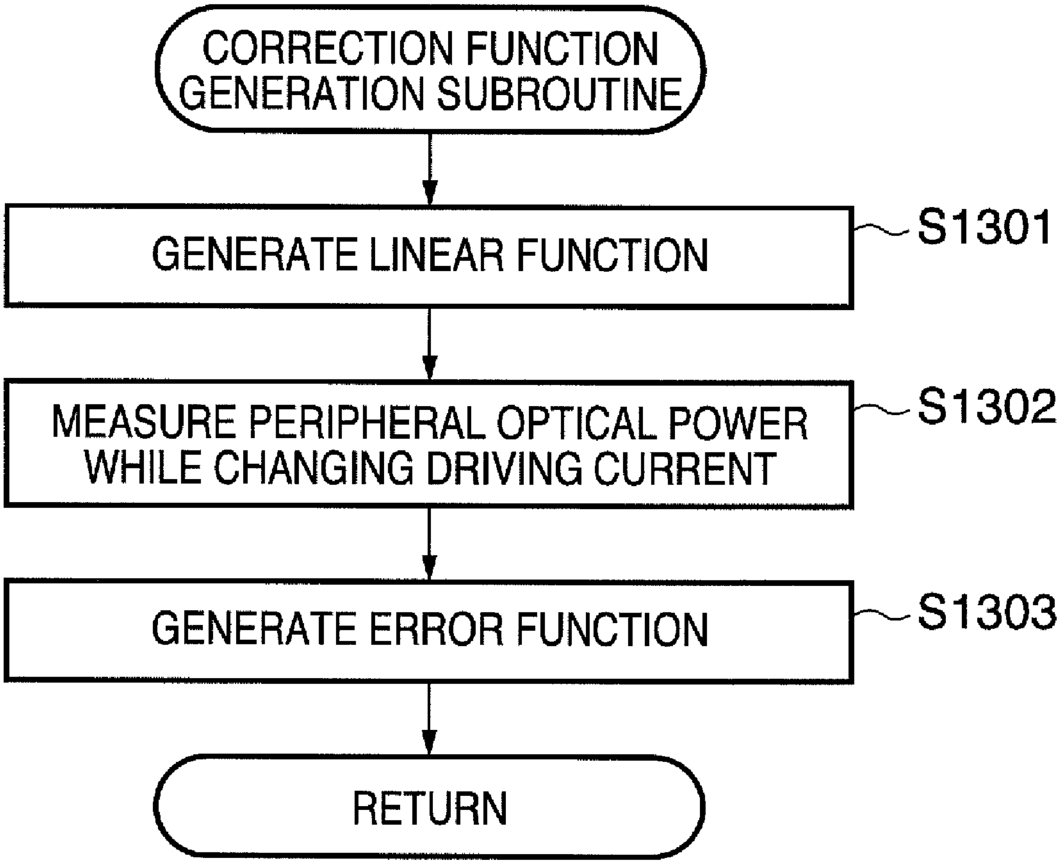
FIG. 13 is a flowchart illustrating a correction function generation process according to the embodiment.

FIG. 13 is a flowchart illustrating a correction function generation process according to the embodiment. This flowchart illustrates the correction function generation process (S805) as a subroutine. Assume that the correction circuit 204 obtains the peripheral optical powers $P_a$ and $P_b$ in the driving current section $[I_a, I_b]$.

In step S1301, the linear function determination unit 901 generates the linear function z(χ) by substituting the obtained peripheral optical powers and the driving currents into $$z(\chi) = \frac{P'b - P'a}{Ib - Ia}(\chi - Ia) + P'a \quad (3)$$

In step S1302, the error function determination unit 902 of the correction circuit 204 turns on the laser 201 and causes the light-receiving element 203 to measure a peripheral optical power p(χ) while changing the driving current χ in the selected section.

3 In step S1303, the error function determination unit 902 generates the error function g(χ) by $$g(\chi)=p(\chi)-z(\chi) \quad (4)$$

The correction function f(χ) is given by $$f(\chi)=k(P-g(\chi)) \quad (5)$$

where k is a coefficient for equalizing the scales of the central optical power and peripheral optical power. This coefficient is preferably determined empirically (k can be 1, as a matter of course). P is the peripheral optical power actually measured by flowing the driving current χ to the laser 201. The peripheral optical power correction unit 903 appropriately corrects the peripheral optical power by using the correction function f(χ) (i.e., by using the error function g(χ)).

As described above, according to this embodiment, the peripheral optical power and the central optical power can be controlled to have an approximately linear characteristic by correcting the peripheral optical power by using the error function g(χ). When APC optical power control is applied to the laser 201, the control error can be reduced as compared to control using the peripheral optical power before correction. Hence, the quality of the formed image also relatively improves.

Figure 14:
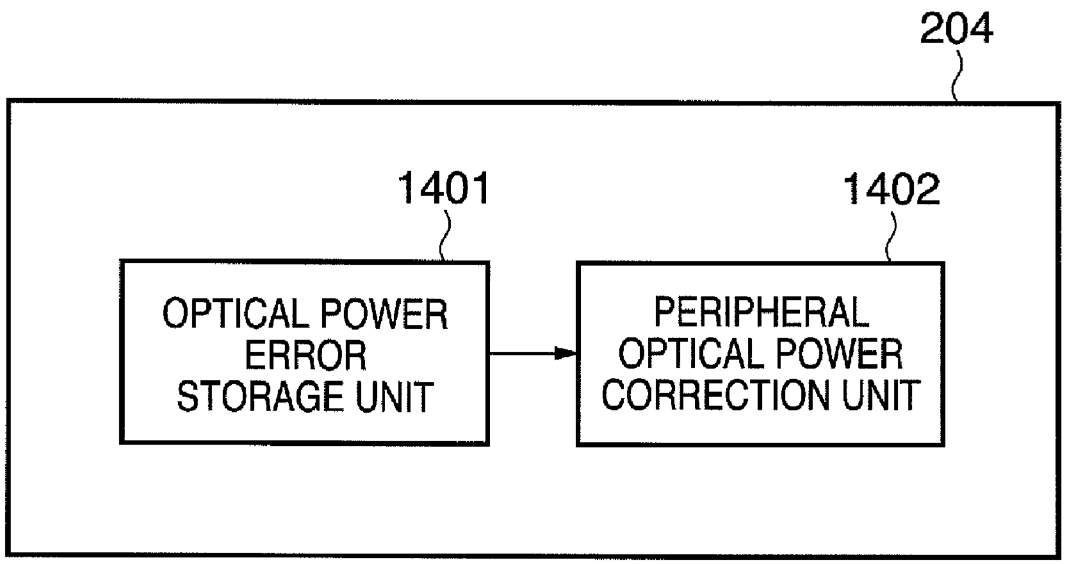
FIG. 14 is a block diagram showing still another example of the correction circuit according to the embodiment.

FIG. 14 is a block diagram showing still another example of the correction circuit according to the embodiment. An optical power error storage unit 1401 is a storage circuit that stores in advance the error between a peripheral optical power and a corresponding central optical power corresponding to each current value. The error is preferably obtained upon shipping from the factory and stored in the optical power error storage unit 1401 in advance. A peripheral optical power correction unit 1402 reads out, from the optical power error storage unit 1401, an error corresponding to the value of the current flowing to the laser 201 and corrects the peripheral optical power obtained by the light-receiving element 203.

As described above, the correction circuit 204 may store the error between the peripheral optical power and the central optical power in advance and correct the peripheral optical power upon optical power control.

If the laser 201 has a plurality of light-emitting elements, optical power control may be done by preparing the light-receiving element 203 for each light-emitting element. Alternatively, at least one representative light-emitting element may be selected from the plurality of light-emitting elements, and the APC circuit 205 and correction circuit 204 may execute optical power control of the remaining light-emitting elements by using the control result of the representative element. To measure the peripheral optical power of the representative light-emitting element, the above-described light-receiving element is provided in each slit corresponding to a light-emitting element.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-164068, filed Jun. 13, 2006, which is hereby incorporated by reference herein in its entirety.

What is claimed is:

1. An optical power control apparatus for controlling an optical power of an optical beam output from an optical beam output apparatus, comprising:

a changing unit which changes, a plurality of number of times, a value of a current flowing to the optical beam output apparatus;

an obtaining unit which obtains, in correspondence with each value of the current, a peripheral optical power representing an optical power at a peripheral part of a spot of the optical beam output from the optical beam output apparatus;

a correction unit which corrects the peripheral optical power so that the peripheral optical power and a central optical power representing an optical power at a central part of the spot have a substantially linear relationship in correspondence with each value of the current; and a control unit which controls the optical power of the optical beam output from the optical beam output apparatus in accordance with the corrected peripheral optical power.

2. The apparatus according to claim 1, wherein said correction unit comprises a normalization unit which normalizes the peripheral optical power obtained in a section from a first value to a second value of the value of the current flowing to the optical beam output apparatus upon use, and a square operation unit which squares the normalized peripheral optical power.

3. The apparatus according to claim 1, wherein said correction unit corrects the peripheral optical power by using an error function representing a difference between the peripheral optical power corresponding to each value of the current flowing to the optical beam output apparatus and an equation of a line that connects a first peripheral optical power obtained by flowing a current with a first value to the optical beam output apparatus to a second peripheral optical power obtained by flowing a current with a second value.

4. The apparatus according to claim 3, wherein said correction unit comprises a first determination unit which determines the equation of the line that connects the first peripheral optical power obtained by flowing the current with the first value to the optical beam output apparatus to the second peripheral optical power obtained by flowing the current with the second value, a second determination unit which determines the error function representing the difference between the equation of the line and the peripheral optical power corresponding to each value of the current flowing to the optical beam output apparatus upon use, and a correction unit which corrects the peripheral optical power by using the error function.

5. The apparatus according to claim 1, wherein said correction unit comprises a storage unit which stores in advance an error between the peripheral optical power corresponding to each value of the current and a corresponding central optical power, and a correction unit which reads out, from said storage unit, the error corresponding to the value of the current flowing to the optical beam output apparatus and corrects the obtained peripheral optical power.

6. An optical power control method of controlling an optical power of an optical beam output from an optical beam output apparatus, comprising the steps of:

changing, a plurality of number of times, a value of a current flowing to the optical beam output apparatus;

obtaining, in correspondence with each value of the current, a peripheral optical power representing an optical power at a peripheral part of a spot of the optical beam output from the optical beam output apparatus;

correcting the peripheral optical power so that the peripheral optical power and a central optical power representing an optical power at a central part of the spot have a substantially linear relationship in correspondence with each value of the current; and controlling the optical power of the optical beam output from the optical beam output apparatus in accordance with the corrected peripheral optical power.

7. An optical power control apparatus for controlling an optical power, comprising:

a light source;

a shaping slit which shapes an optical beam emitted from said light source by blocking a part of the optical beam and passing another part of the optical beam;

a detecting unit which detects an amount of the part of the optical beam blocked by said shaping slit;

a correction unit which corrects the detected amount of the part of the optical beam; and a control unit which controls an amount of the optical beam emitted from said light source in accordance with the corrected amount of the part of the optical beam, wherein said correction unit corrects the detected amount of the part of the optical beam based on a first amount of a part of an optical beam and a second amount of a part of an optical beam, the first amount being detected while said light source is driven by a first driving current and the second amount being detected while said light source is driven by a second driving current being different from the first driving current, and wherein said control unit controls a driving current applied to said light source based on the correction result of said correction unit.

8. The apparatus claimed in claim 7, further comprising a normalization unit which normalizes the amount detected by said detecting unit based on said first and second amounts.

9. The apparatus claimed in claim 8, further comprising a square operation unit which squares the normalized amount.

10. The apparatus claimed in claim 7, wherein said correction unit corrects the detected amount using:

an equation of a straight line that connects the first and second amounts; and an error function representing a difference between the equation of the straight line and a plurality of amounts detected by said detection unit corresponding to a plurality of driving current.

11. The apparatus claimed in claim 10, said correction unit further comprising:

a first determination unit which determines the equation of the straight line;

a second determination unit which determines the error function using the determined equation of the straight line; and a modifying unit which modifies the detected amount based on the determined error function.

12. The apparatus claimed in claim 7, said correction unit further comprising:

a storage unit which stores a correction value for correcting the detected amount; and a modifying unit which modifies the detected amount based on the stored correction value read out from said storage unit.

13. A method for controlling an optical power, comprising the steps of:

emitting an optical beam from a light source;

shaping the optical beam emitted from said light source by blocking a part of the optical beam and passing another part of the optical beam using a shaping slit;

detecting an amount of the part of the optical beam which is blocked by said shaping slit;

correcting the detected amount of the part of the optical beam; and controlling an amount of the optical beam emitted from said light source in accordance with the corrected amount of the part of the optical beam, wherein said step correcting includes the step of correcting the detected amount of the part of the optical beam based on a first amount of a part of an optical beam and a second amount of a part of an optical beam, the first amount being detected while said light source is driven by a first driving current and the second amount being detected while said light source is driven by a second driving current being different from the first driving current, and wherein said controlling step includes the step of controlling a driving current applied to said light source based on the correction result of said step of correcting.

14. The method claimed in claim 13, further comprising the step of normalizing the amount detected in said step of detecting based on said first and second amounts.

15. The method claimed in claim 14, further comprising a square operation unit which squares the normalized amount.

16. The method claimed in claim 13, wherein said step of correcting comprising the step of correcting the detected amount using:

an equation of a straight line that connects the first and second amounts; and an error function representing a difference between the equation of the straight line and a plurality of detected amounts corresponding to a plurality of driving current.

17. The method claimed in claim 16, said step of correcting further comprising the sets of:

determining the equation of the straight line;

determining the error function using the determined equation of the straight line; and modifying the detected amount based on the determined error function.

18. The method claimed in claim 13, said step of correcting further comprising the steps of:

storing a correction value for correcting the detected amount; and modifying the detected amount based on the stored correction value.

* * * * *